United States Patent [19]

Hayashi et al.

[11] Patent Number: 5,788,386
[45] Date of Patent: Aug. 4, 1998

[54] COMPACT ERGONOMIC KEYBOARD

[75] Inventors: Kazutoshi Hayashi; Michihiro Aoyama; Masayuki Katoh; Masatoshi Ishii, all of Tokyo, Japan

[73] Assignee: Fujitsu Limited, Kawasaki, Japan

[21] Appl. No.: 705,852

[22] Filed: Aug. 28, 1996

[30] Foreign Application Priority Data

Nov. 9, 1995 [JP] Japan ................... 7-290890

[51] Int. Cl.$^6$ ........................................ B41J 5/08
[52] U.S. Cl. .................................... 400/489; 341/22
[58] Field of Search ..................... 400/472, 489; 345/168; 341/22; 361/680

[56] References Cited

U.S. PATENT DOCUMENTS

| | | | |
|---|---|---|---|
| D. 362,434 | 9/1995 | Abell, Jr. et al. | D14/115 |
| 4,661,005 | 4/1987 | Lahr | 400/489 |
| 4,847,798 | 7/1989 | Kurashima | 364/708 |
| 5,073,050 | 12/1991 | Andrews | 400/82 |
| 5,342,005 | 8/1994 | Szamada et al. | 248/118 |
| 5,361,082 | 11/1994 | Chung | 345/168 |
| 5,424,728 | 6/1995 | Goldstein | 341/22 |
| 5,466,078 | 11/1995 | Szmanda et al. | 400/489 |
| 5,543,787 | 8/1996 | Karidis et al. | 341/20 |
| 5,574,481 | 11/1996 | Lee | 345/168 |
| 5,612,691 | 3/1997 | Murmann et al. | 341/22 |

FOREIGN PATENT DOCUMENTS

| | | |
|---|---|---|
| 7-160386 | 6/1995 | Japan . |
| 7-200121 | 8/1995 | Japan . |
| 2 285 770 | 7/1995 | United Kingdom . |
| WO 92/00851 | 1/1992 | WIPO . |
| WO 92/18926 | 10/1992 | WIPO . |

*Primary Examiner*—Edgar S. Burr
*Assistant Examiner*—Dave A. Ghatt
*Attorney, Agent, or Firm*—Staas & Halsey

[57] ABSTRACT

A keyboard includes a first keyboard unit for left hand operation of an operator, a second keyboard unit separable from the first keyboard unit, for right hand operation of the operator, and a fix plate movable between the first and second keyboard units, wherein one of the first and second keyboard units accommodates the fix plate when the first and second keyboard units are separated from each other, the fix plate bridges the first and second keyboard units when the first and second keyboard units are connected with each other to form a single keyboard, and a fixing mechanism is provided for fixing the fix plate upon the first and second keyboard units in the state that the fix plate bridges across the first and second keyboard units.

12 Claims, 8 Drawing Sheets

COMPACT ERGONOMIC KEYBOARD

BACKGROUND OF THE INVENTION

The present invention generally relates to keyboards for use in various computers, and more particularly to an ergonomic keyboard that prevents tenosynonitis of the operator.

Recent advancement of so-called office automation has increased the chance for an office worker to use computers and word processors extensively.

Generally, conventional computers and word processors use a keyboard as an input device, and an operator has to manipulate numerous keys provided on the keyboard. As the operator spends considerable time for inputting data or sentence by manipulating the keyboard, there is an increasing concern about the health hazard of the operator caused by tenosynonitis.

In order to prevent the problem of tenosynonitis of the operator, various proposals have been made about the construction of user-friendly keyboard, such as the one called "ergonomic keyboard." An ergonomic keyboard is a keyboard designed according to the teaching of human engineering and realizes a best position known also as an ergonomic position, in which the keyboard is bent with an angle of 25°. Such an ergonomic keyboard may further have a slant angle of 10°, and carries keys with a mutual separation of 65 mm between key groups.

In order to realize the foregoing best position, a typical ergonomic keyboard divides the alphanumeric keyboard, in which alphanumeric keys and function keys are arranged, into a first keyboard part and a second keyboard part generally at the central part of the foregoing alphanumeric keyboard, such that the first keyboard part and the second keyboard part are disposed in conformity with the foregoing ergonomic arrangement.

Such an ergonomic keyboard includes the so-called "natural keyboard" proposed by the Microsoft Corp., in which a left-hand keyboard and a right-hand keyboard are arranged with the foregoing ergonomic angle, and the so-called "adjustable keyboard" proposed by the Apple Computer, Inc. in which the left-hand keyboard and the right-hand keyboard are adjustable with respect to the mutual angle.

However, such conventional ergonomic keyboards, while realizing an ergonomic environment, still raise various problems.

For example, the keyboard of the Microsoft Corp., in which the geometrical relationship between the left-hand keyboard and the right-hand keyboard is fixed, inevitably has a large size and occupies a considerable space of the desktop of the operator. Further, handling of such a large keyboard is cumbersome, particularly when it becomes necessary to make a space on the desktop by removing the keyboard. on the other hand, the "adjustable keyboard" of Apple Computer arranges the left-hand keyboard and the right-hand keyboard on a common plane and hence is not a true ergonomic design in which the right-hand keyboard and the left-hand keyboard should form the angle of 25°.

Further, it should be noted that a commonly used keyboard of desk-top computers includes an additional keyboard unit for a ten-key pad including also cursor keys, wherein such an additional keyboard unit is generally disposed at the right side of the alphanumeric keyboard in continuation therewith.

When designing an ergonomic keyboard including such an additional keyboard unit, the size of the right-hand keyboard, which includes the additional keyboard unit at the right side thereof as an integral body, becomes inevitably larger than the left-hand keyboard. In other words, the ergonomic keyboard becomes asymmetric about the border between the left-hand keyboard and the right-hand keyboard.

When an optimum slant angle of 10° is to be realized in such an asymmetric ergonomic keyboard for both the right-hand keyboard and the left-hand keyboard, it becomes therefore necessary to form the left-hand keyboard and the right-hand keyboard have an increased height, in view of the additional keyboard unit at the right side of the right-hand keyboard. However, such a design of the ergonomic keyboard inevitably increases the overall height of the keyboard. When the slant angle of the left-hand keyboard is to be changed with respect to the right-hand keyboard in order to avoid the increase of the keyboard height, on the other hand, the ergonometry of the keyboard is no longer maintained.

SUMMARY OF THE INVENTION

Accordingly, it is a general object of the present invention to provide a novel and useful keyboard wherein the foregoing problems are eliminated.

Another and more specific object of the present invention is to provide a keyboard that can be used either in a normal position in which the keyboard occupies only a small space of desktop and in an ergonomic position in which the keyboard provides ergonometry.

Another object of the present invention is to provide an ergonomic keyboard including a left-hand keyboard and a right-hand keyboard, wherein a ten-key unit is formed in continuation to left-hand or right-hand keyboard, and wherein the left-hand and the right-hand keyboards both have a common height and a common slant angle while suppressing the increase of the keyboard height.

Another object of the present invention is to provide an ergonomic keyboard, comprising:

a first keyboard unit carrying thereon keys adapted for operation by fingers of one of right and left hands of an operator;

a second keyboard unit separable from said first keyboard unit, said first and second keyboard units carrying thereon keys adapted for operation by fingers of the other of said right and left hands of said operator, said first and second keyboard units forming together a single keyboard when connected with each other;

a fix plate movable between said first and second keyboard units, one of said first and second keyboard units accommodating therein said fix plate when said first and second keyboard units are separated from each other, said fix plate bridging said first and second keyboard units and connecting said first and second keyboard units with each other when said first and second keyboard units are connected with each other to form a single keyboard; and a fixing mechanism for fixing said fix plate upon said first and second keyboard units in the state that said fix plate bridges across said first and second keyboard units.

According to the present invention, the fix plate is accommodated in one of the first and second keyboard units when the first and second keyboard units are separated from each other. Thus, one can arrange the first and second keyboard units freely and independently to each other in the state that the first and second keyboard units are separated. Thereby, the first and second keyboard units form together an ergonomic keyboard.

Further, the first and second keyboard units can be connected with each other by the fix plate to form a single, integral keyboard such as the one used commonly in computers and word processors. In other words, the keyboard of the present invention can be used not only as a user-friendly, ergonomic keyboard, but also as an ordinary, compact keyboard of which handling is relatively easy.

By providing a ten-key pad to one of the first and second keyboard units via a deformable connection part, it becomes possible to form both the first and second keyboard units to have a common height and a common slant angle even in such a case that the ten-key pad is connected to the first or second keyboard unit, without increasing the overall height of the keyboard.

Another object of the present invention is to provide an ergonomic keyboard, comprising:

a first keyboard unit carrying thereon keys adapted for operation by fingers of one of right and left hands of an operator;

a second keyboard unit separable from said first keyboard unit, said first and second keyboard units carrying thereon keys adapted for operation by fingers of the other of said right and left hands of said operator, said first and second keyboard units forming together a single keyboard when connected with each other, said first keyboard unit and said second keyboard unit forming a single keyboard carrying keys adapted for operation by the fingers of the right and left hands of said operator, in a first state in which said first and said keyboard units are connected to each other; and a fix plate fixing said first keyboard unit and said second keyboard unit rigidly with each other in said first state, said fix plate further fixing said first keyboard unit and said second keyboard unit rigidly with each other at an arbitrary position in which said first and second keyboard units are separated from each other, with an arbitrary subtending angle therebetween.

According to the present invention, it is possible to change a normal keyboard easily to an ergonomic keyboard, by moving the first and second keyboard units with respect to the fix plate continuously to an arbitrary position.

Other objects and further features of the present invention will become apparent from the following detailed description when read on conjunction with the attached drawings.

DETAILED DESCRIPTION OF THE PREFERRED EMBODIMENTS

Figure 1:
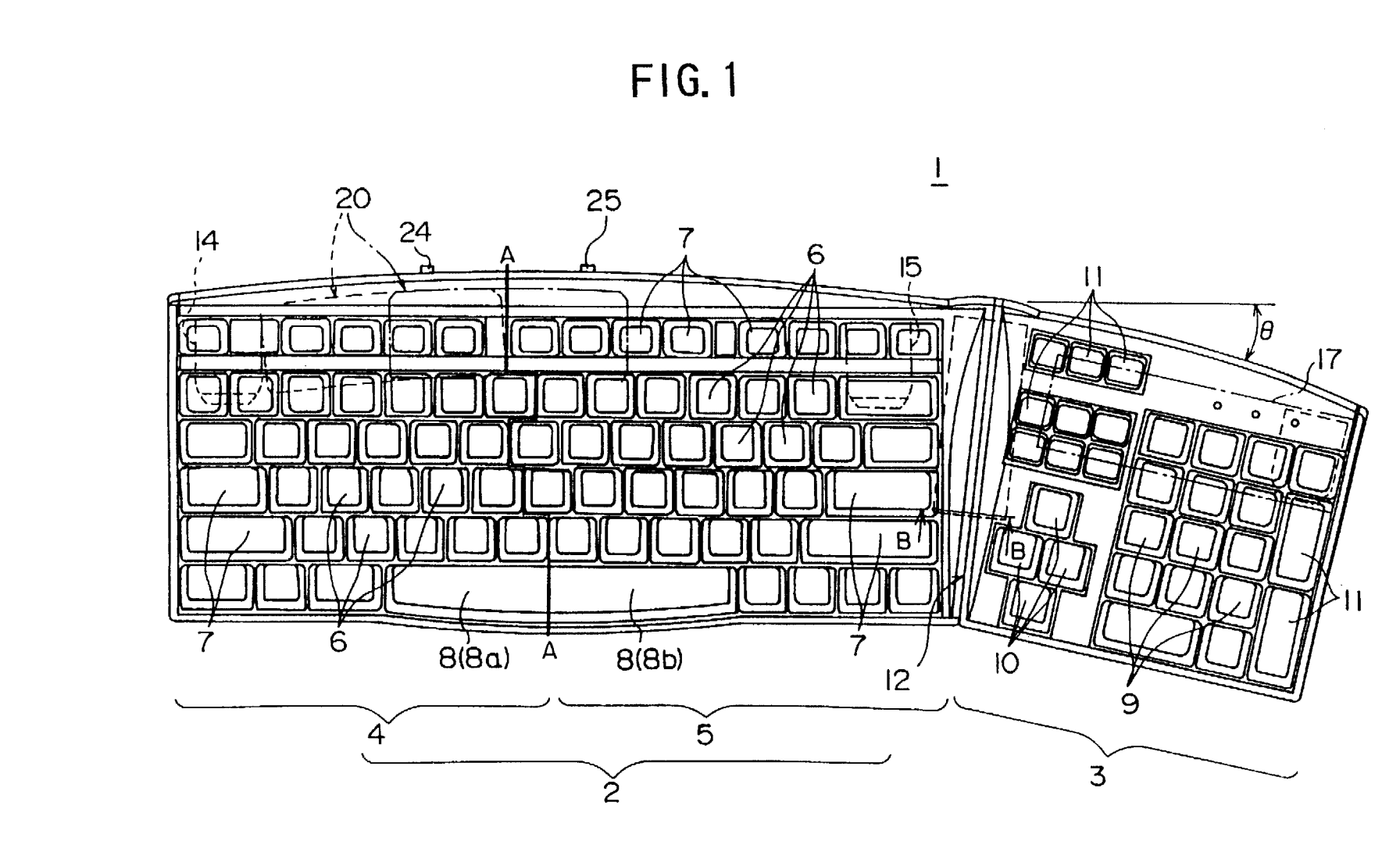
FIG. 1 is a diagram showing a keyboard according to a first embodiment of the present invention in a normal position.
Figure 2A:
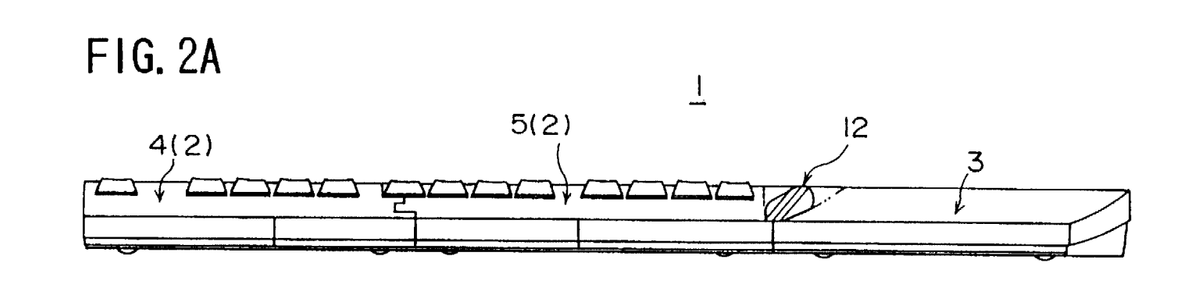
FIGS. 2A and 2B are diagrams showing the front view of the keyboard of FIG. 1 in first and second states.
Figure 2B:
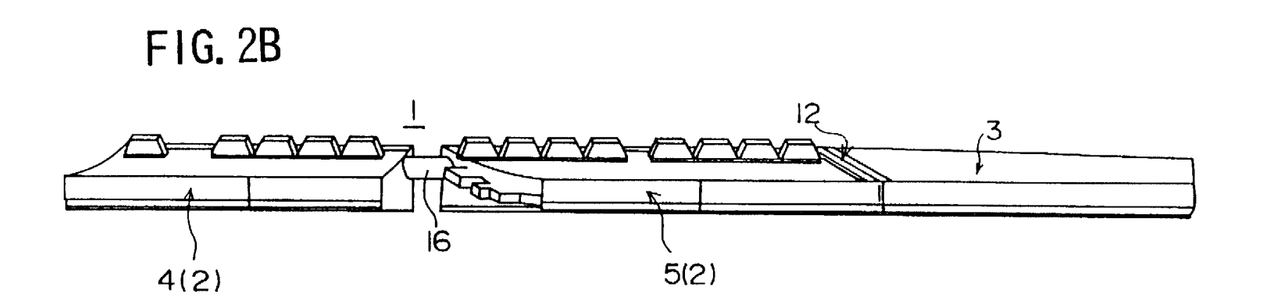
Figures 3A, 3B:
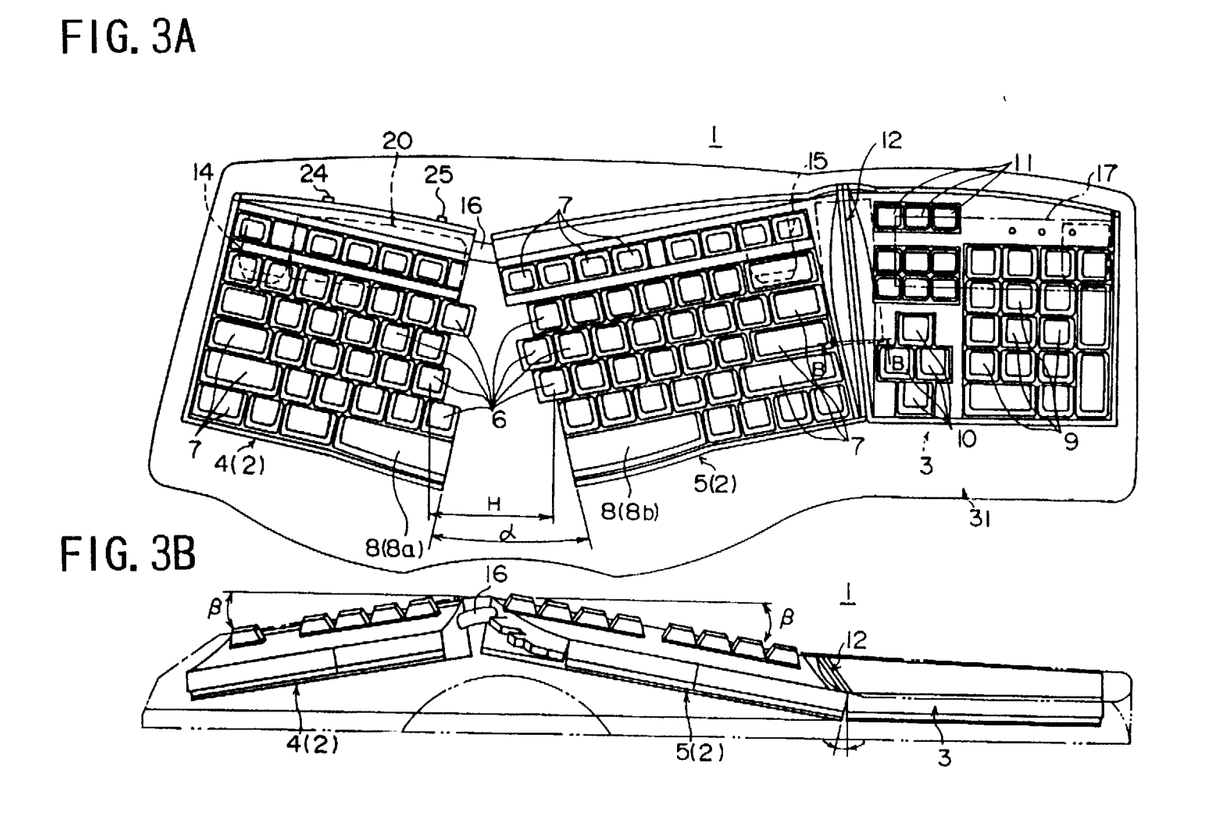
FIGS. 3A and 3B are diagrams showing the keyboard of FIG. 1 in an ergonomic position.
Figure 4:
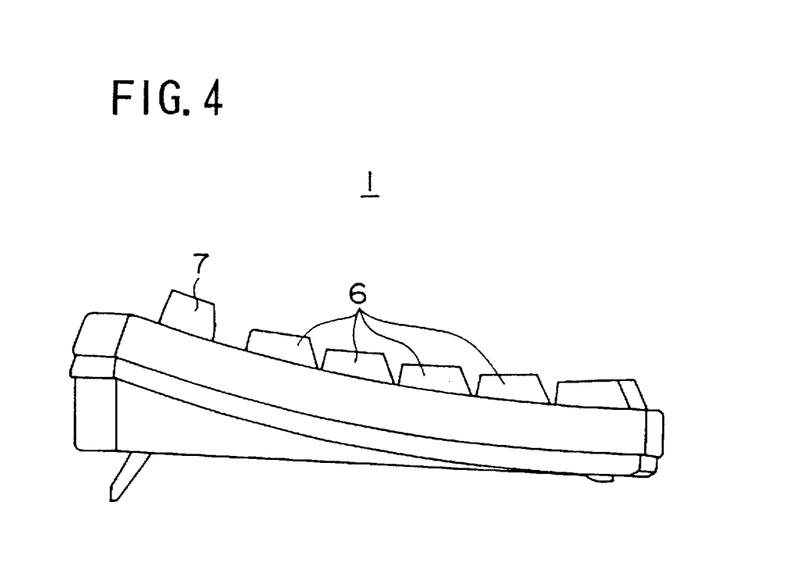
FIG. 4 is a diagram showing the keyboard of FIG. 1 in a side view.
Figure 5:
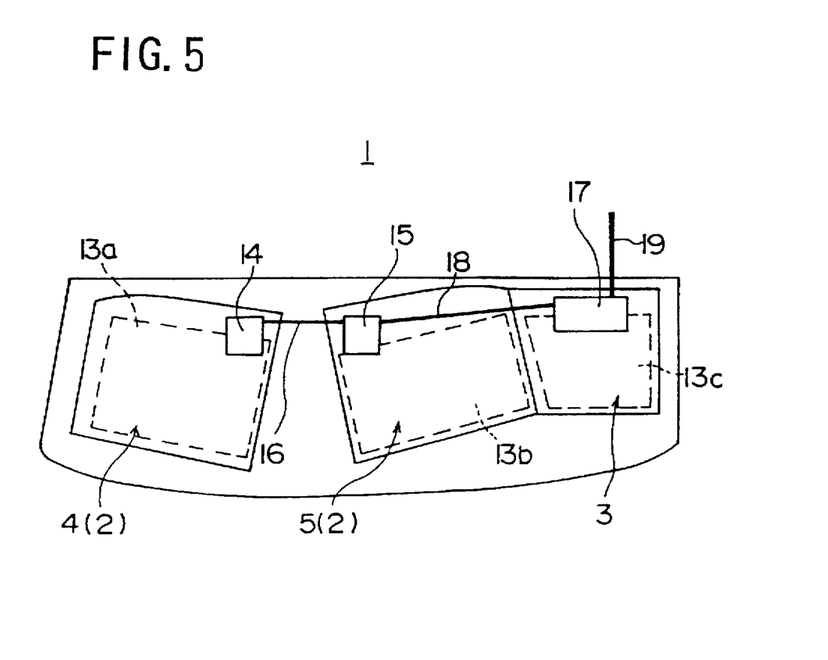
FIG. 5 is a diagram showing the circuit construction of the keyboard of FIG. 1.
Figure 6A:
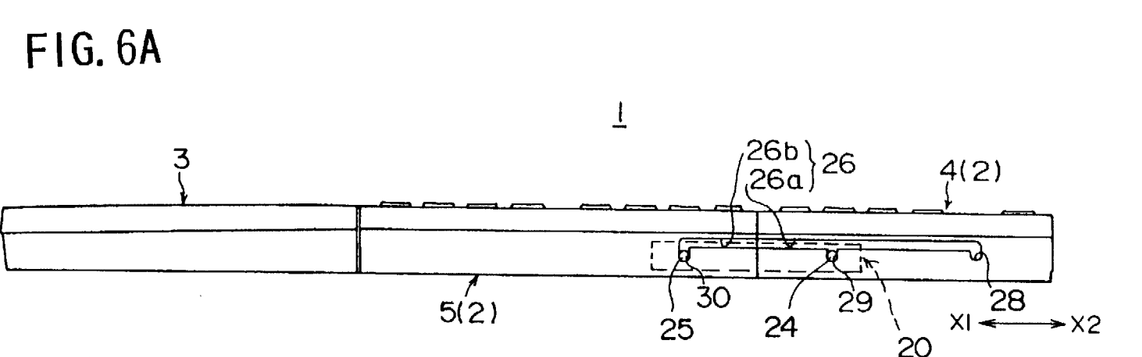
FIGS. 6A and 6B are diagrams showing the rear view of the keyboard of FIG. 1 respectively in the first and second states.
Figure 6B:
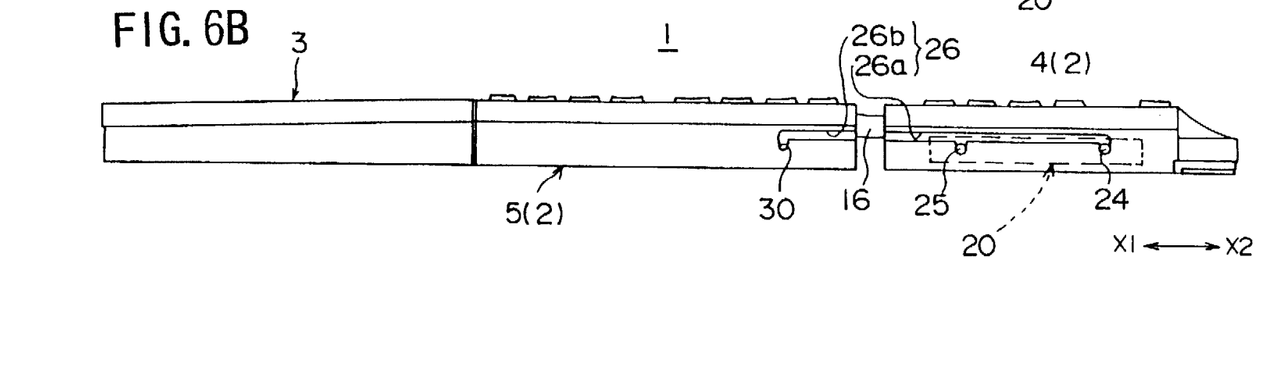

FIG. 1 is a plan view showing a keyboard 1 according to a first embodiment of the present invention in a first, compact state thereof, while FIGS. 2A and 2B respectively represent the keyboard 1 in a front view for the foregoing first state corresponding to FIG. 1 and a second state. Further, FIGS. 3A and 3B show the keyboard 1 in an ergonomic position corresponding to the state of FIG. 2B, while FIG. 4 shows the keyboard 1 in a side view. Further, FIG. 5 shows the circuit construction of the keyboard 1, and FIGS. 6A and 6B show a rear view of the keyboard 1 respectively in the first state of FIG. 2A and in the second state of FIG. 2B.

Referring to the drawings noted above, the keyboard 1 includes a main keyboard 2 and a ten-key/cursor-key pad 3, while the main keyboard 2 is formed, in turn, of a left-hand keyboard unit 4 and a right-hand keyboard unit 5 that are separable at a boundary designated in FIG. 1 by a line A—A.

As usual, the main keyboard 2 carries thereon a number of alphanumeric keys 6, function keys 7 and a spacer key 8, wherein the left-hand keyboard unit 4 carries thereon those keys that are generally manipulated by the left hand of the user, while the right-hand keyboard unit 5 carries thereon those keys that are generally manipulated by the right hand of the user.

The ten-key/cursor-key pad 3, on the other hand, carries thereon a ten-key keyboard 9, cursor keyboard 10, and some function keys 11, wherein the key pad 9 is formed in physical connection to the right-hand keyboard unit 5 at the right side thereof via a connection part 12. In other words, the ten-key/cursor key pad 3 forms a unitary body with the right-hand keyboard unit 5. Thereby, the ten-key/cursor key pad 3 is bend within the plane of FIG. 1 and forms an angle Θ with respect to the keyboard unit 5, wherein the angle Θ may be set to 10°, for example, when measured in the clockwise direction.

Next, a description will be made about the circuit construction of the keyboard 1 with reference to FIG. 5.

Referring to FIG. 5, it will be noted that each of the keyboard units 4 and 5 forming the keyboard 1 as well as the ten-key/cursor key pad 3 includes a corresponding membrane sheet 13a–13c, wherein each of the membrane sheets 13a–13c carries thereon a wiring pattern (not shown) formed, for example, by a screen printing process.

More specifically, each of the membrane sheets 13a–13c includes a spacer layer (not shown) carrying at both sides thereof the respective wiring patterns, and pressing of a part of the membrane by a corresponding key induces a contact of the both wiring patterns.

As the keyboard 1 of the present embodiment includes the keyboard units 4 and 5 as well as the key pad 3, it is necessary to provide a construction for connecting these with each other electrically. For this purpose, the keyboard 1 of the present invention uses a cable 16 of which construction will be explained below.

As already noted, the left-hand keyboard unit 4 includes the membrane sheet 13a, while the right-hand keyboard unit 5 includes the membrane sheet 13b. Further, the keyboard units 4 and 5 include therein relay substrates 14 and 15 respectively as indicated in FIG. 5. Thereby, the relay substrate 14 is connected to the membrane sheet 13a electrically, while the relay substrate 15 is connected to the membrane sheet 13b electrically.

It should be noted that the foregoing cable 16 connects the relay substrate 14 and the relay substrate 15 electrically with each other via connectors not illustrated. The cable 16 includes a plurality of wires bundled with each other and has a flexible construction. Further, the cable 16 has a sufficient length for allowing the keyboard units 4 and 5 to be disposed with a separation from each other in the ergonomic position shown in FIGS. 3A and 3B.

Similarly to the keyboard units 4 and 5, the ten-key/cursor-key unit 3 includes the membrane sheet 13c therein as well as a main control board 17 connected electrically to the membrane sheet 13c, wherein the main control board 17 carries thereon a microcomputer typically of an 8-bit architecture for interface processing between the keyboard 1 and a host computer to which the keyboard 1 is connected. The main control board 17 is connected to the relay substrate 15 via a cable 17 electrically and further to the host computer via a cable 19.

By connecting the relay substrates 14 and 15 by the cable 16, it is possible to maintain an electric interconnection between the membrane sheets 13a and 13b, even when the left-hand keyboard unit 4 and the right-hand keyboard unit 5 are separated from each other.

In the construction of FIG. 5, it should be noted that the cable 16 includes a loose or slackened, excessive part in either of the left unit 4 and the right unit 5, such that the cable 16 of such a slackened part is exposed in the state of FIG. 5. In order to prevent excessive loosening of the exposed cable 16, it is preferable to provide a stopper mechanism on the unit 14 of 15 such that such an excessive loosening of the cable 16 is prevented.

When a flat, flexible circuit substrate is used for the connection of the membrane sheets 13a and 13b in place of the cable 16, on the other hand, there is a substantial risk that the electric interconnection is disrupted at the time of separating the keyboard units 4 and 5 from each other. By using the cable 16, in which the wires are bundled and covered by a resin sheath, it is possible to achieve a much larger mechanical strength for the interconnection between the keyboard units 4 and 5, as compared with the case in which a flat flexible circuit substrate is used for the same purpose.

As will be explained later in detail, the connection part 12 connecting the right-hand keyboard unit 5 and the ten-key/cursor-key pad 3, is formed to be flexible. When a flexible circuit substrate is used for the connection part 12, it is expected that the electrical interconnection is easily disrupted. In the present embodiment, the problem of disruption of electrical interconnection is successfully avoided by connecting the relay substrate 15 and the main control board 17 by another cable 18 of a similar construction to the cable 16. It should be noted that the relay substrates 14 and 15, as well as the main control board 17, are illustrated also in FIG. 1 by broken lines.

As the left-hand keyboard unit 4 and the right-hand keyboard unit 5 are separable from each other, the user of the keyboard 1 can dispose the keyboard unit 4 and the keyboard unit 5 in an ergonomic position as indicated in FIGS. 3A and 3B. In the position of FIGS. 3A and 3B, the user manipulates the left-hand keyboard unit 4 by the left hand fingers and the right-hand keyboard unit 5 by the right hand fingers. Any arbitrary and preferred arrangement can be made for the keyboard units 4 and 5 within the limit posed by the length of the cable 16.

On the other hand, the keyboard 1 of the present embodiment allows the user to operate the keyboard 1 in the state that the foregoing keyboard units 4 and 5 are connected with each other. In such a case of normal position operation, the keyboard units 4 and 5 are assembled with each other as indicated in FIG. 1, and a fix plate 20 is used to connect the keyboard units 4 and 5 with each other. The fix plate 20 is thereby fixed upon the keyboard units 4 and 5 by means of a fixing mechanism to be explained below in detail.

Figure 7:
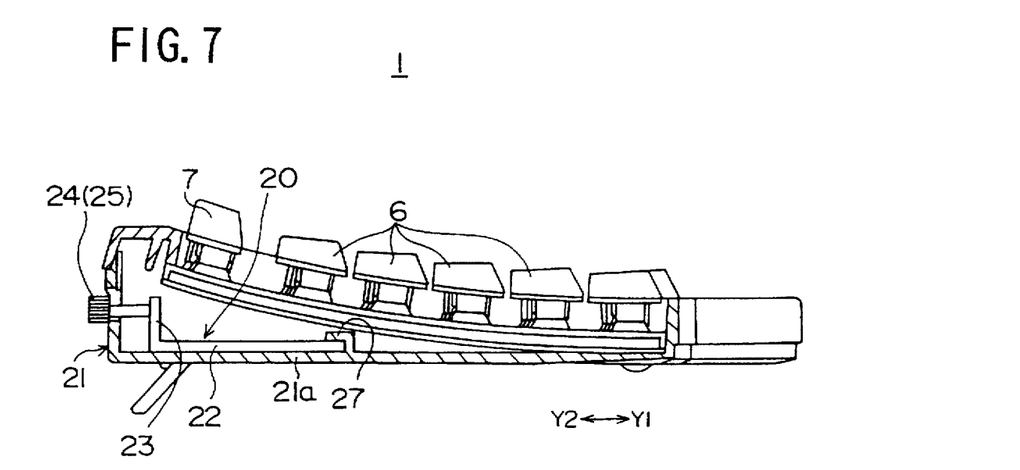
FIG. 7 is a diagram showing the keyboard of FIG. 1 in a locked state.
Figure 8:
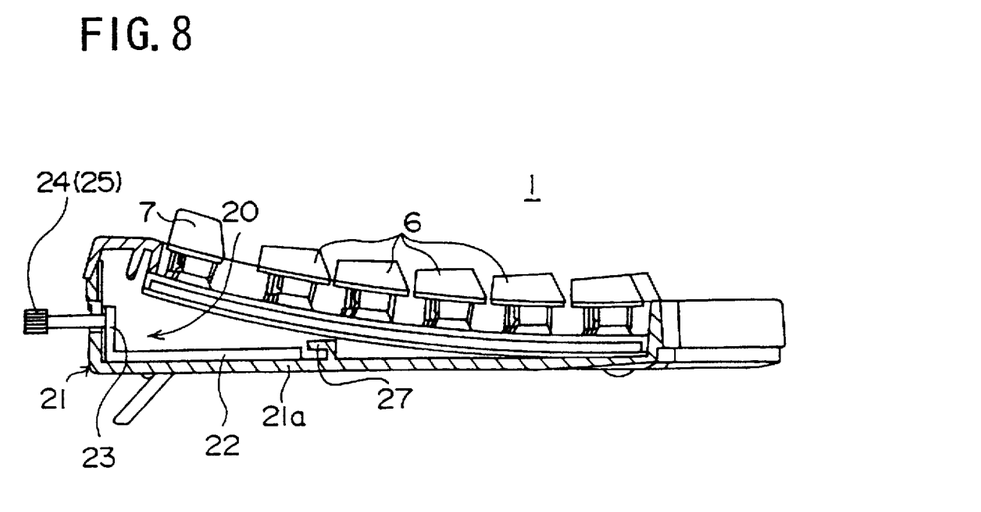
FIG. 8 is a diagram showing the keyboard of FIG. 1 in an unlocked state.

The fix plate 20 is formed of a rigid plate member having a longitudinal edge thereof bent to form an L-shaped cross section as indicated in FIGS. 7 and 8.

Referring to FIGS. 7 and 8, the fix plate 20 includes a horizontal part 22 extending parallel to a horizontal bottom 21a of a keyboard housing 21 and a vertical edge 23 bent to form a right angle with respect to the horizontal part 22. Thereby, the fix plate 20 has an L-shaped cross section as already noted, and wherein the fix plate 20 is slidable in the direction of arrows $X_1$ and $X_2$ as indicated in FIGS. 6A and 6B. It will be noted that FIGS. 6A and 6B show the keyboard 1 in a rear view.

The fixing mechanism in turn includes pins 24 and 25 provided on the foregoing vertical edge 23 of the fix plate 20 and a guide groove 26 formed on the rear wall of the keyboard housing 21 as shown in FIG. 6, wherein the guide groove 26 guides the pins 24 and 25 therethrough when the fix plate 20 is moved in the $X_1$- and $X_2$-directions. Further, the fixing mechanism includes a slot 27 formed on the bottom 21a of the keyboard housing 21 as indicated in FIGS. 7 and 8 for accepting an edge of the fix plate 20 that opposes the vertical edge 23. It should be noted that the slot 27 is provided in each of the keyboard units 4 and 5 at the bottom 21a thereof. In the construction of FIGS. 7 and 8, it will be noted that one may use screws for the pins 24 and 25.

Hereinafter, the operation of the fix plate 20 and the fixing mechanism will be described.

In the state of FIG. 6A where the left-hand keyboard unit 4 and the right-hand keyboard unit 5 are connected each other, it will be noted that the fix plate 20 is moved in the $X_1$-direction and bridges across the keyboard units 4 and 5 in this state. The guide groove 26 includes a left part 26a and a right part 26b respectively formed on the left-hand keyboard unit 4 and the right-hand keyboard unit 5, wherein the left part 26a and the right part 26b form together the single, continuous guide groove 26 in the state of FIG. 6A.

It will be noted that the guide groove 26 further includes three, downwardly extending cutouts 28–30 at respective, predetermined positions, wherein it will be noted that the pins 24 and 25 engage the cutouts 29 and 30 in the state of FIG. 6A, in which the keyboard units 4 and 5 are connected to each other. Further, the pins 24 and 25 engage the cutouts 28 and 29 in the state of FIG. 6B in which the keyboard units 4 and 5 are separated from each other.

As indicated in FIG. 7, the slot 27 engages the edge of the fix plate 20 when the relationship between the keyboard units 4 and 5 is to be locked. Thereby, the fix plate 20 is urged in the $Y_1$-direction by firmly pressing the pins 24 and 25 in the $Y_1$-direction in the state that the pins 24 and 25 engage the cutouts 29 and 30 respectively. By pulling the fix plate 20 firmly in the $Y_2$-direction, on the other hand, the fix plate 20 disengages from the slot 27, and the keyboard units 4 and 5 are unlocked.

In the state of FIG. 6A, therefore, the horizontal part 22 of the fix plate 20 firmly engages the slot 27 formed in each of the keyboard units 4 and 5 as indicated in FIG. 7. Further, it will be noted that the pins 24 and 25 engage the cutouts 29 and 30 respectively. Thereby, the keyboard units 4 and 5 are locked with each other by the fix plate 20, and no rattling occurs even when the user strikes the keys.

In the case the user prefers to use the keyboard in the ergonomic position, the pins 24 and 25 are pulled firmly in the $Y_2$-direction as indicated in FIG. 8. For this purpose, each of the pins 24 and 25 carries a knob at the pin head.

As a result of the pulling out of the pins 24 and 25 as such, the fix plate 20 moves also in the $Y_2$-direction, and the fix plate 20 disengages from the slot 27. The pins 24 and 25 thus pulled out are then pushed in the upward direction so as to disengage from the cutouts 29 and 30. In this state, the pins 24 and 25 are movable freely in the $X_1$- and $X_2$-directions along the guide groove 26. Further, the fix plate 20 is moved in the $X_2$-direction by moving the pins 24 and 25 in the $X_2$-direction along the groove 26, such that the fix plate 20 goes out of the right-hand keyboard unit 5. As a result, the left-hand keyboard unit 4 and the right-hand keyboard unit 5 are separated from each other.

After the keyboard units 4 and 5 are separated from each other as such, the fix plate 20 is engaged into the slot 27 formed in the left-hand keyboard unit 4 by firmly pressing the pins 24 and 25 in the state that the pins 24 and 25 engage the cutouts 28 and 29. Thereby, the rattling of the fix plate 20 is eliminated. The user can thereafter dispose the left-hand keyboard unit 4 and the right hand keyboard unit 5 at a desired, ergonomic position. As the fix plate 20 is firmly engaged with the slot 27 in the keyboard unit 4, the problems such as the fix plate 20 rattles during the operation of the keys on the keyboard unit 4 or the fix plate 20 popping up accidentally from the keyboard unit 4, are successfully eliminated.

It should be noted further that the present invention successfully eliminates the problem of the pins 24 and 25 disturbing the operation of the keyboard by the user, by disposing the pins 24 and 25 at the rear side of the keyboard housing 21. The construction of the present invention is further advantageous as compared with the construction in which the pins 24 and 25 are provided at the bottom 21a of the keyboard housing 21 in view of easiness of manipulation of the pins 24 and 25.

Of course, it is possible to construct the keyboard 1 such that the fix plate 20 is accommodated in the right-hand keyboard unit 5 in the ergonomic position.

As noted above, the keyboard 1 of the present embodiment can provide both the normal position and the ergonomic position according to the preference of the operator. Further, the switching of the position can be achieved easily by merely manipulating the pins 24 and 25 at the rear side of the keyboard housing 21. Further, no problem of rattling occurs even when the operator strikes the keys in any of the normal position and the ergonomic position.

When using the keyboard 1 in the ergonomic position, one may use a keyboard base 31 shown in FIG. 3, wherein the keyboard base 31 determines the positions of the keyboard units 4 and 5 at the respective, optimum ergonomic positions. In the ergonomic position of FIG. 3, it will be noted that the right-hand keyboard unit 5 is bent with respect to the left-hand keyboard unit 4 in the plane of FIG. 3 in the counter-clockwise direction with an angle α, wherein the angle α is typically set to 25°. Further, both the keyboard units 4 and 5 are tilted respectively in the left direction and in the right direction with a slant angle β of 10°. Further, the keyboard units 4 and 5 are separated form each other horizontally with a distance H of 65 mm, wherein the distance H is measured between the key "G" on the keyboard unit 4 and the key "H" on the keyboard unit 5.

In the normal position of the keyboard 1 shown in FIG. 1, it will be noted that the ten-key/cursor-key pad 3 is tilted, within the plane of FIG. 1, by an angle Θ of typically 10° in the clockwise direction with respect to the right-hand keyboard unit 5. By doing so, the key pad 3 extends generally straight in the right direction when the keyboard units 4 and 5 are disposed in the ergonomic position shown in FIG. 3.

When the angle Θ is small or zero, the keypad 3 would extend in the upper-right direction in the ergonomic position, and the use of the ten-keypad 3 becomes extremely difficult. Further, such a configuration increases the overall size of the keyboard 1 in the ergonomic position. In other words, the keyboard 1 occupies a large space in the ergonomic position when the foregoing angle Θ is small or zero.

The foregoing angle Θ, on the other hand, causes a corresponding tilting Θ of the keypad 3 in the normal position of FIG. 1. However, such a tilting of the keypad 3 toward the user does not cause any material influence on the easiness of using the keypad 3.

As already noted, the ten-key/cursor-key pad 3 and the right-hand keyboard unit 5 are connected with each other by the connection part 12, wherein it should be noted that the connection part 12 has a flexible construction that allows a tilting of the keypad 3 with respect to the keyboard unit 5, such the surface of the keypad 3 forms an angle with respect to the surface of the keyboard unit 5.

When the relationship between the keyboard unit 5 and the keypad 3 is rigid, it will be noted that the total length of the keyboard unit 5 including the keypad 3 becomes larger than the length of the keyboard unit 4, resulting in a situation in which the left-hand keyboard unit 4 is floating above the desktop surface in the ergonomic position shown in FIG. 3. Even when a support is provided under the floating keyboard unit 4, such a construction inevitably increases the overall height of the keyboard 1 in the ergonomic position, as long as the optimum slant angle β is retained.

The foregoing problem of increased height of the keyboard 1 is of course avoided by providing a steep slant angle β for the left-hand keyboard unit 4. However, such a construction has a drawback in that the slant angle β of the keyboard unit 4 is no longer optimum. In other words, the position of the keyboard 1 is no longer ergonomic.

The present invention avoids the foregoing problem by forming the connection part 12 to be deformable as already noted. Thereby, the ten-key/cursor-key pad 3 is held horizontal even when the left-hand and right-hand keyboard units 4 and 5 are arranged to have the optimum slant angle β of 10°. See FIG. 3B.

Figure 9A:
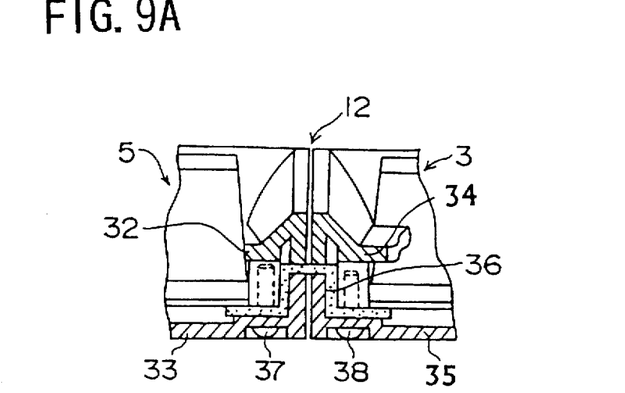
FIGS. 9A and 9B are diagrams showing the flexible connection of a ten-key pad to a keyboard unit forming a part of the keyboard of FIG. 1.
Figure 9B:
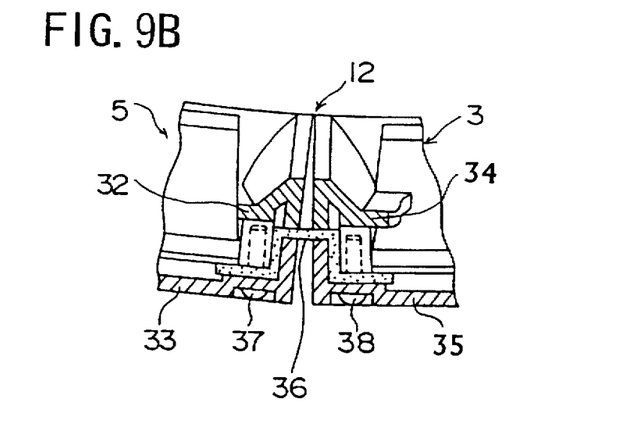

FIGS. 9A and 9B show the construction of the connection part 12 in detail in a cross sectional view, wherein FIG. 9A shows the connection part 12 in the normal position shown in FIG. 1 while FIG. 9B shows the connection part 12 in the ergonomic position shown in FIGS. 3A and 3B. In any of FIGS. 9A and 9B, the cross section is taken along a line B—B shown in FIG. 3A.

Referring to FIGS. 9A and 9B, the connection part 12 includes an upper case 32 of the right-hand keyboard unit 5, a lower case 33 of the keyboard unit 5, an upper case 34 of the keypad 3, and a lower case 35 of the keypad 3. Further, the connection part 12 includes a flexible member 36, typically formed of a soft material such as polypropylene such that the flexible member 36 intervenes between the upper and lower cases 32 and 33 of the keyboard unit 5 and between the upper and lower cases 34 and 35 of the keyboard unit 4. Further, the upper and lower cases 32 and 33 are connected with each other by a screw 37, with the flexible member 36 intervening therebetween. Similarly, the upper and lower cases 34 and 35 are connected with each other by a screw 38 with the flexible member 36 intervening therebetween.

Thus, the flexible member 36 deforms when the right-hand keyboard unit 5 and the keypad 3 are to be twisted with each other as indicated in FIG. 9B, wherein it will be noted that the flexible member 36 acts as a hinge connecting the keyboard unit 5 and the keypad 3. As a result of the deformation of the flexible member 36, the keypad 3 can be placed horizontally on the desktop even in the state that the keyboard units 4 and 5 are tilted with respect to the desktop surface with the optimum slant angle β, without increasing the overall height of the keyboard 1.

Figure 10A:
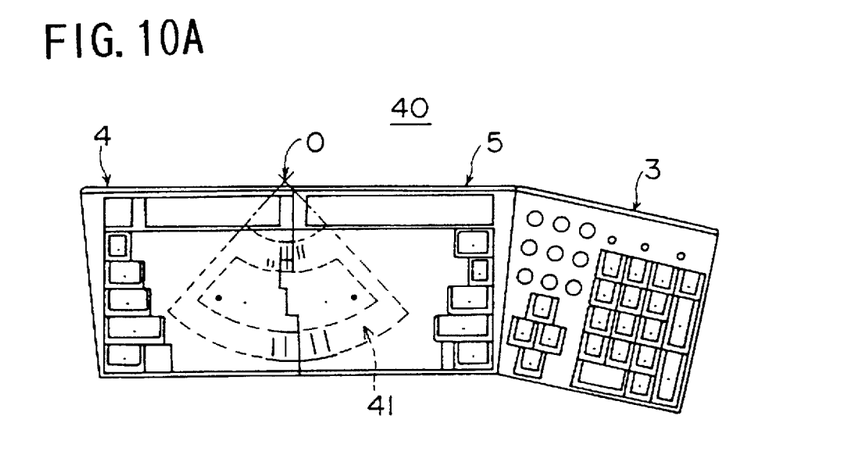
FIGS. 10A and 10B are diagrams showing the construction of a keyboard according to a second embodiment of the present invention.
Figure 10B:
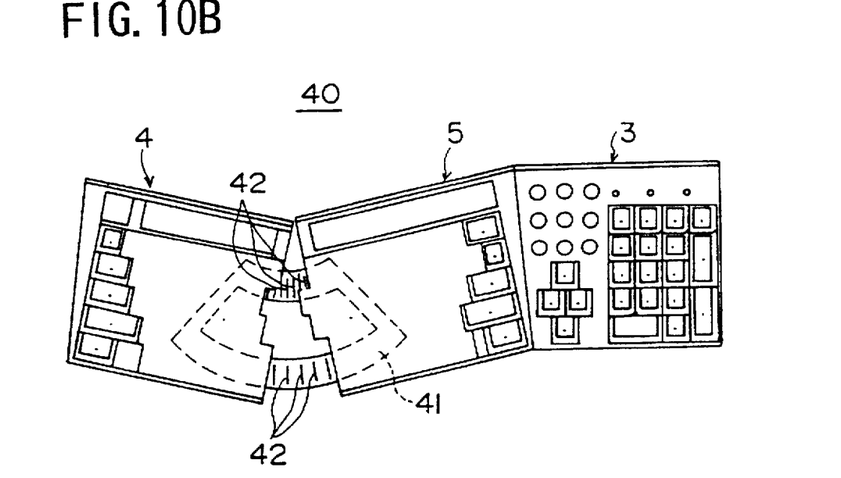

FIGS. 10A and 10B show a keyboard 40 according to a second embodiment of the present invention, wherein those parts corresponding to the parts described previously are designated by the same reference numerals and the description thereof will be omitted.

Referring to FIGS. 10(A) and 10(B), the keyboard 40 includes a fan-shaped fix plate 41 in place of the fix plate 20 of the L-shaped cross section, wherein the fix plate 41 is disposed between the left-hand keyboard unit 4 and the right-hand keyboard unit 5 and connects the keyboard units 4 and 5 with each other in the normal position shown in FIG. 10A.

It should be noted that the fan-shaped fix plate 41 is used also in the ergonomic position of the keyboard 40 shown in FIG. 10B, in which the keyboard units 4 and 5 are separated from each other.

More specifically, the keyboard units 4 and 5 are guided by the fan-shaped fix plate 41 and are movable to and from each other along an arcuate path defined by the fan-shaped fix plate 41 about an origin O represented in FIG. 10A. The fix plate 41 carries thereon a number of slits 42 formed with a predetermined separation, and the slide movement of the keyboard units 4 and 5 along the fix plate 41 provides a crick feeling as a result of engagement of the slit 42 and a spring (not shown) provided on the keyboard units 4 or 5. As a result of such an elastic engagement of the spring with the slit 42, the keyboard units 4 and 5 are locked at a desired angular position.

The keyboard 40 has an advantageous feature of easy adjustment for a desired near-ergonomic position, though it may not be the true ergonomic position.

When to achieve the true ergonomic position in the keyboard 40, the fix plate 41 is removed and the keyboard units 4 and 5 are separated from each other completely. Thereby, the keyboard units 4 and 5 are disposed on the keyboard base 31 shown in FIGS. 3A and 3B. Further, one may construct such that the fix plate 41 is accommodated in one of the keyboard units 4 and 5.

It should be noted that the construction of the flexible part 12 described previously with reference to the first embodiment is applicable also to the keyboard 40 of the present embodiment.

Further, the construction of FIG. 5 of the relay substrates 14 and 15 connected with each other by the cable 16 is applicable also to the keyboard 40 of the present embodiment. Similarly, the construction of the relay substrate 15 and the control board 17 connected by the cable 18 as indicated in FIG. 5 is applicable to the keyboard 40 of the present embodiment.

Further, the present invention is not limited to the embodiments described heretofore, but various variations and modifications may be made without departing from the scope of the invention.

What is claimed is:

1. A keyboard, comprising
    a first keyboard unit carrying thereon keys adapted for operation by fingers of one of right and left hands of an operator;
    a second keyboard unit separable from said first keyboard unit, said second keyboard unit carrying thereon keys adapted for operation by fingers of the other of said right and left hands of said operator, said first and second keyboard units forming together a single keyboard when connected with each other;
    a fix plate movable between said first and second keyboard units,
        one of said first and second keyboard units accommodating therein the entirety of said fix plate when said first and second keyboard units are separated from each other,
        said fix plate bridging across said first and second keyboard units and attaching said first and second keyboard units with each other when said first and second keyboard units are connected with each other to form a single keyboard; and
    a fixing mechanism for fixing said fix plate to said first and second keyboard units in the state that said fix plate bridges across said first and second keyboard units.

2. A keyboard as claimed in claim 1,
    wherein said first and second keyboard units each have a housing,
    wherein said fix plate includes a horizontal part and a vertical edge continuing to said horizontal part, and
    wherein said fixing mechanism includes: a pin connected to said vertical edge of said fix plate for actuating said fix plate; and a slot provided in each of said housings of said first and second keyboard units for engagement with said horizontal part at an edge thereof opposing said vertical edge, said slot being disposed, in each of said housings, such that said horizontal part engages thereinto in the state in which said first and second keyboard units are connected with each other.

3. A keyboard as claimed in claim 1, wherein said keyboard further includes a keyboard base for supporting said first and second keyboard units at a predetermined position with respect to each other when the first and second keyboard units are separated from each other.

4. A keyboard as claimed in claim 1, further comprising a third keyboard unit connected to said second keyboard unit via a connection part, in continuation with said second keyboard unit, said connection part being deformable and connecting said third keyboard unit to said second keyboard unit in a manner such that an angle formed between a major plane of said third keyboard unit and a major plane of said second keyboard unit is variable.

5. A keyboard as claimed in claim 4,
    wherein said first and second keyboard units each have a housing,
    wherein said connection part includes a flexible member connecting said second keyboard unit and said third keyboard unit, and wherein the housing of said first keyboard unit and the housing of said second keyboard unit engage with each other at a fulcrum to form a hinge mechanism that is movable about said fulcrum.

6. A keyboard as claimed in claim 1, wherein said first and second keyboard units include therein first and second electric circuit boards, and wherein said first and second circuit boards are connected with each other by a flexible cable that includes a bundle of wires each covered by an insulation sheath.

7. A keyboard as claimed in claim 1, wherein the first and second keyboard units each have a first end facing the operator and an opposing second end, the second ends of the first and second keyboard units each having an opening through which the fixing mechanism is operated.

8. A keyboard, comprising:
- a first keyboard unit carrying thereon keys adapted for operation by fingers of one of right and left hands of an operator;
- a second keyboard unit separable from said first keyboard unit, said first and second keyboard units carrying thereon keys adapted for operation by fingers of the other of said right and left hands of said operator, said first keyboard unit and said second keyboard unit forming a single keyboard carrying keys adapted for operation by the fingers of the right and left hands of said operator, in a first state in which said first and said keyboard units are connected to each other; and
- a removable fix plate for securing said first keyboard unit and said second keyboard unit with respect to each other, in said first state,
- said fix plate further securing said first keyboard unit and said second keyboard unit with respect to each other at an arbitrary position in which said first and second keyboard units are separated from each other, the first and second keyboard units each having a first end facing the operator and an opposing second end, the fix plate allowing the first and second keyboard units to move with respect to each other such that, as the first and second keyboard units separate, a distance of separation between the first ends is greater than a distance of separation between the second ends,
- said fix plate being detachable from the first and second keyboard units when the first and second keyboard units are separated from each other.

9. A keyboard as claimed in claim 8, wherein said fix plate guides said first and second keyboard units along an arcuate path.

10. A keyboard as claimed in claim 8, further comprising a third keyboard unit connected to said second keyboard unit via a connection part, in continuation with said second keyboard, said connection part being deformable and connecting said third keyboard unit to said second keyboard unit in a manner such that an angle formed between a major plane of said third keyboard unit and a major plane of said second keyboard unit is variable.

11. A keyboard as claimed in claim 10, wherein said first and second keyboard units each have a housing,
wherein said connected part includes a flexible member connecting said second keyboard unit and said third keyboard unit, and
wherein a housing of said first keyboard unit and a housing of second keyboard unit engage with each other at a fulcrum to form a hinge mechanism that is movable about said fulcrum.

12. A keyboard as claimed in claim 8, wherein said first and second keyboards include therein first and second electric circuit boards, and wherein said first and second circuit boards are connected with each other by a flexible cable that includes a bundle of wires each covered by an insulation sheath.

* * * * *

UNITED STATES PATENT AND TRADEMARK OFFICE
CERTIFICATE OF CORRECTION

PATENT NO.: 5,788,386
DATED : August 4, 1998
INVENTOR(S): Kazutoshi HAYASHI et al.

It is certified that error appears in the above-identified patent and that said Letters Patent is hereby corrected as shown below:

On the Title Page, [73] Assignee:, change "Fujitsu Limited, Kawasaki, Japan" to --FUJITSU TAKAMISAWA COMPONENT LIMITED, TOKYO, JAPAN--.

Col. 1, line 54, change "on" to --On--.

Col. 10, line 23, change "the" to --an--.

Signed and Sealed this

Twenty-fourth Day of August, 1999

Attest:

Q. TODD DICKINSON

*Attesting Officer*   *Acting Commissioner of Patents and Trademarks*